United States Patent
Komatsu

(10) Patent No.: US 8,330,382 B2
(45) Date of Patent: Dec. 11, 2012

(54) ELECTRONIC BALLAST FOR CORRECTING ASYMMETRICAL CURRENT FLOW ACROSS A GAS DISCHARGE LAMP

(75) Inventor: Naoki Komatsu, Hyogo (JP)

(73) Assignee: Panasonic Corporation, Osaka (JP)

( * ) Notice: Subject to any disclaimer, the term of this patent is extended or adjusted under 35 U.S.C. 154(b) by 254 days.

(21) Appl. No.: 12/694,892

(22) Filed: Jan. 27, 2010

(65) Prior Publication Data

US 2010/0194303 A1 Aug. 5, 2010

(30) Foreign Application Priority Data

Jan. 27, 2009 (JP) ................................. 2009-015969

(51) Int. Cl.
*H05B 41/36* (2006.01)
*H05B 37/02* (2006.01)
(52) U.S. Cl. ........................................ 315/224; 315/307
(58) Field of Classification Search .................. 315/50, 315/64, 65, 70, 72, 200 R, 209 R, 211, 212, 315/214, 215, 216, 291, 307, 308, DIG. 7, 315/DIG. 2, DIG. 4, DIG. 5
See application file for complete search history.

(56) References Cited

U.S. PATENT DOCUMENTS

| 6,008,592 A * | 12/1999 | Ribarich ........................ 315/225 |
| 6,548,966 B2 * | 4/2003 | Kawasaka et al. ............. 315/291 |
| 7,425,802 B2 * | 9/2008 | Kumagai et al. .............. 315/291 |
| 7,486,028 B2 * | 2/2009 | Langeslag et al. ......... 315/209 R |
| 7,586,266 B2 * | 9/2009 | Breuer et al. .................. 315/224 |

FOREIGN PATENT DOCUMENTS

WO WO03039206 5/2003

* cited by examiner

*Primary Examiner* — Minh D A
(74) *Attorney, Agent, or Firm* — Waddey & Patterson, P.C.; Mark J. Patterson; Gary L. Montle

(57) ABSTRACT

An electronic ballast for powering a discharge lamp includes an asymmetry determination circuit functional to determine whether positive and negative polarities of an AC output current to the lamp are symmetrical. An inverter having a plurality of switching elements is coupled to a DC power source and converts the DC power to the AC output current. A control circuit is functional to control the plurality of switching elements dependent upon an operating mode and an output from the asymmetry determination circuit. The control circuit controls the switching elements in a normal mode upon receiving a determination of symmetrical current from the asymmetry determination circuit, and controls the switching elements in a restart mode for a predetermined period of time upon receiving a determination of asymmetrical current from the asymmetry determination circuit.

19 Claims, 16 Drawing Sheets

ELECTRONIC BALLAST FOR CORRECTING ASYMMETRICAL CURRENT FLOW ACROSS A GAS DISCHARGE LAMP

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: Japan Patent Application No. 2009-015969, filed Jan. 27, 2009.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to electronic ballasts for powering a discharge lamp, and a lamp fixture including various embodiments of such a ballast.

Electronic ballasts for powering a discharge lamp of a thermionic cathode type such as a high pressure discharge lamp, which is also called an HID (high-intensity discharge) lamp, are conventionally known in the art and may generally include a DC-AC power converter circuit and a control circuit for controlling the power converter.

Certain control circuits as known for a discharge lamp ballast of this type may perform a starting operation to ignite the discharge lamp by making the voltage output from the power converter relatively high, a filament heating operation to make the frequency of power output from the power converter relatively high for heating each filament of the discharge lamp, and a normal operation to cause the power converter to maintain an output AC power for stable lighting of the lamp.

Accordingly, lamp operation is stabilized after transition to a normal operation, in comparison with a case where filament heating is not performed and discharge is suppressed which may undesirably extinguish the lamp.

Referring to FIG. 26(a), a starting period P1 for performing a starting operation is followed by a filament heating period P2 for performing a filament heating operation, and a normal period P3 for performing normal lamp operation. If the filament heating period P2 is relatively short, the lamp filament is not heated sufficiently before the start of the normal period P3, wherein current output to the discharge lamp (referred to as a "lamp current" hereinafter) becomes asynchronous in polarity. Transition to normal operation without sufficient heating of the lamp filament will result in unstable discharge after transition to normal operation and the lamp may even be extinguished. Accordingly, it is necessary to make the filament heating period P2 sufficiently long as shown in FIG. 26(b), but a required length of the filament heating period P2 (i.e., a duration of filament heating operation) varies with respect to each lamp.

Accordingly, if the duration of a filament heating is determined with reference to a discharge lamp which requires a relatively long period of time to perform a filament heating operation with respect to all the lamps assumed to be connected, this duration is likely excessive to the other lamps. Because the filament heating operation causes a power converter to output power of greater amplitude than in the normal operation, the duration of the filament heating needs to be as short as possible in order to prevent adverse effects to discharge lamp life.

BRIEF SUMMARY OF THE INVENTION

In accordance with the present invention, a discharge lamp ballast is provided for consistent lamp ignition and prevention of unstable lighting due to an asymmetrical current.

In an embodiment, an electronic ballast for powering a discharge lamp includes an asymmetry determination circuit configured to determine whether positive and negative polarities of AC output current to the lamp are symmetrical. An inverter having a plurality of switching elements is coupled to a DC power source and converts the DC power to the AC output current. A control circuit is configured to control the plurality of switching elements dependent upon operating mode and an output from the asymmetry determination circuit. The control circuit controls the switching elements in a normal mode upon receiving a determination of symmetrical current from the asymmetry determination circuit, and controls the switching elements in a restart mode for a predetermined period of time upon receiving a determination of asymmetrical current from the asymmetry determination circuit.

In another embodiment, a discharge lamp ballast includes a DC-AC power converter and a resonant circuit connected, along with a discharge lamp, between output terminals of the power converter so as to generate a high voltage for starting the lamp. An asymmetry determination circuit determines whether or not the output current from the power converter to the lamp is symmetrical with regards to a positive and a negative polarity. A control circuit controls the power converter in accordance with the operating mode. In a starting mode, a first output frequency from the power converter is supplied to the resonant circuit, wherein a high voltage is generated to start the lamp. In a filament heating mode, the output frequency from the power converter is adjusted to a second frequency for a predetermined period of time wherein each filament of the lamp is heated. In a normal mode, an output frequency from the power converter is adjusted to a third frequency lower than the second frequency. After completion of the filament heating mode, the control circuit transitions to the normal mode upon a symmetrical determination of the output current by the asymmetry determination circuit, and transitions to a restart mode of repeating the filament heating mode with an operation to reduce a difference in the output current between the positive and the negative polarities upon an asymmetrical determination of the output current.

In another embodiment, a method is provided for controlling a plurality of switches in an electronic ballast for powering a discharge lamp, the method in a first step includes receiving at the plurality of switches a DC power input. A second step is performing a starting operation of controlling the switches to turn on and off at a first driving frequency to supply an AC output to a resonant circuit, wherein a high voltage is generated to ignite the lamp. A third step is performing a heating operation of controlling the switches at a second driving frequency for a predetermined period of time to heat one or more lamp filaments. A fourth step is determining whether positive and negative peak values of an output current to the lamp are symmetrical or asymmetrical. Upon determining the peak values to be asymmetrical, the next step is performing a restart operation for the predetermined period of time to correct the peak value asymmetry, followed by repeating the asymmetry determination step. Upon determining the peak values to be symmetrical, the final step may be performing a normal operation of controlling the switches at a third driving frequency to maintain stable lighting.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

With reference generally to FIGS. 1-27, various embodiments of an electronic ballast and associated control operations may be herein described for powering a discharge lamp of a thermionic cathode type such as a high pressure discharge lamp, which is also called an HID (high-intensity discharge) lamp.

Figure 2:
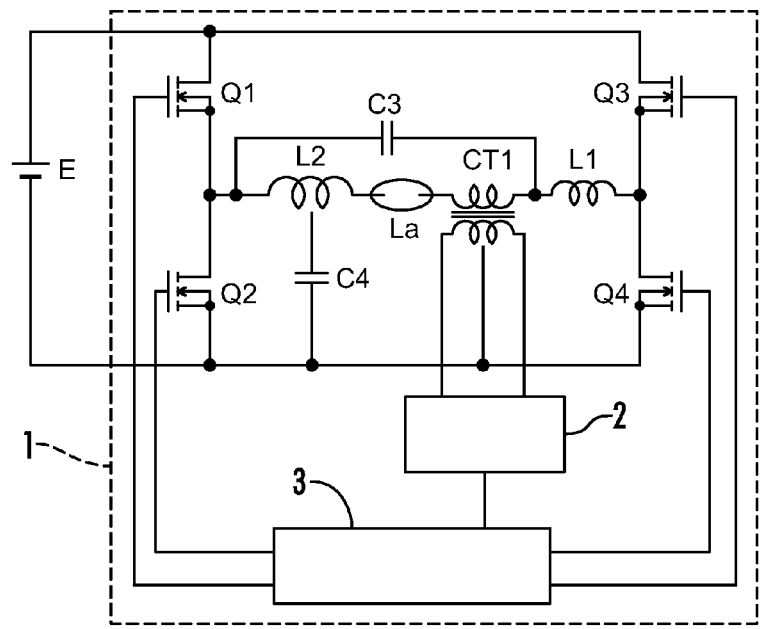
FIG. 2 is a schematic diagram of a ballast in accordance with an embodiment of the present invention.

In one embodiment, a lamp ballast 1 is provided as shown in FIG. 2 and includes a full bridge circuit having four switching elements Q1 to Q4 as a power converter for converting DC power input from a DC power source E into AC power. For the switching elements Q1 to Q4, a field effect transistor (MOSFET) is used in the embodiment shown. A converter output terminal between switching elements Q3 and Q4 is coupled to one end of a discharge lamp La via a series circuit including a first inductor L1 and a primary winding of a current transformer CT1. Another converter output terminal between switching elements Q1 and Q2 is coupled to the other end of the discharge lamp La via a second inductor L2. A first capacitor C3 is coupled on a first end between the switching elements Q1 and Q2 and on a second end to a connection point of the primary winding of current transformer CT1 and the first inductor L1. The second inductor L2 further serves as an autotransformer provided with a tap, and this tap is grounded via a capacitor C4. The first inductor L1, the first capacitor C3, the second inductor L2 and the second capacitor C4 together constitute, along with the discharge lamp La, a resonant circuit (referred to as a "load circuit" hereinafter) coupled between the output terminals of the power converter.

An asymmetry determination circuit 2 is coupled to a secondary winding of the current transformer CT1 so as to determine whether or not a current output Ila to the lamp La (referred to as a "lamp current" hereinafter) is positive/negative symmetrical. A control circuit 3 drives each of the switching elements Q1 to Q4 to be turned on/off.

Figure 3:
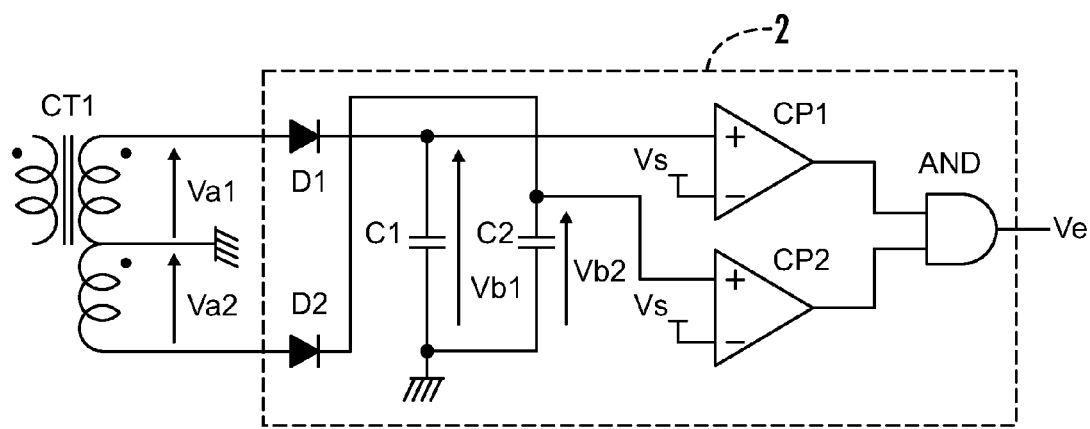
FIG. 3 is a circuit diagram of an asymmetry determination circuit according to the embodiment of FIG. 2.

The asymmetry determination circuit 2, as shown in FIG. 3, includes two comparators CP1 and CP2 each of which has a non-inverting input connected to one end of the secondary winding of the current transformer CT1 via a diode D1 or D2 and an inverting input for receiving a predetermined symmetry determination voltage Vs, and an AND circuit for outputting, to the control circuit 3, a logical output from comparators CP1 and CP2. A grounded tap is arranged at the center of a secondary winding of the current transformer CT1. The connection points between the non-inverting inputs of the comparators CP1 and CP2 and the diodes D1 and D2 are grounded via capacitors C1 and C2 respectively. Charge voltages Vb1 and Vb2 on the capacitors C1 and C2 correspond to peak values of output voltages Val and Vat from the diodes D1 and D2 respectively, or correspond to peak values of the lamp current Ila in directions (or polarities) corresponding to the capacitors C1 and C2 respectively. The charge voltages Vb1 and Vb2 are input to the non-inverting inputs of the comparators CP1 and CP2 corresponding to the capacitors C1 and C2 respectively.

Figure 4A:
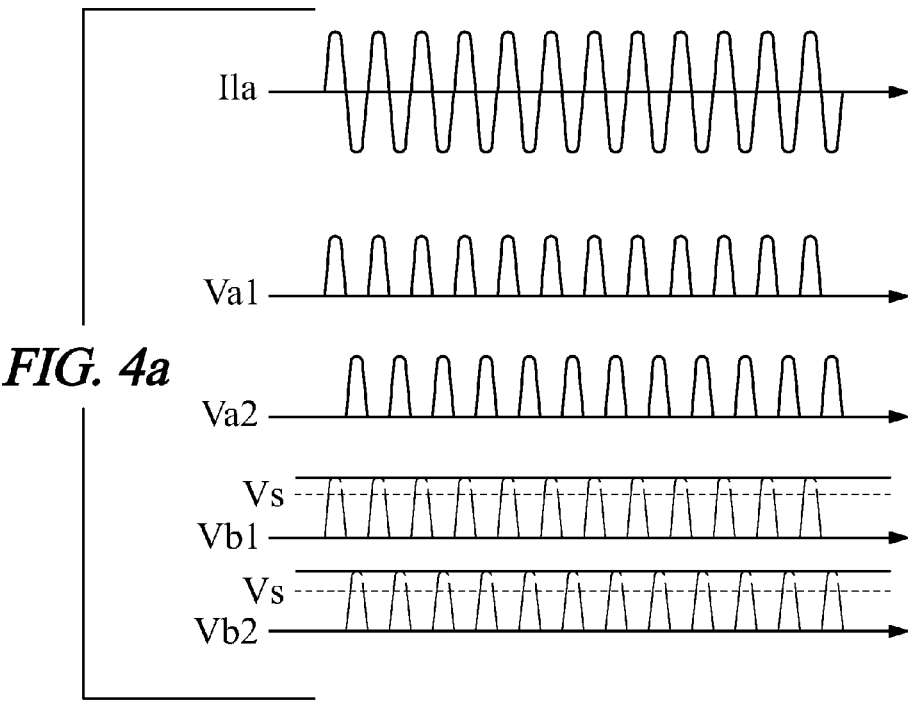
FIGS. 4(a) and (b) are graphical diagrams showing examples of operation in the asymmetry determination circuit of FIG. 3, with FIG. 4(a) showing a symmetrical lamp current and FIG. 4(b) showing an asymmetrical lamp current.
Figure 4B:
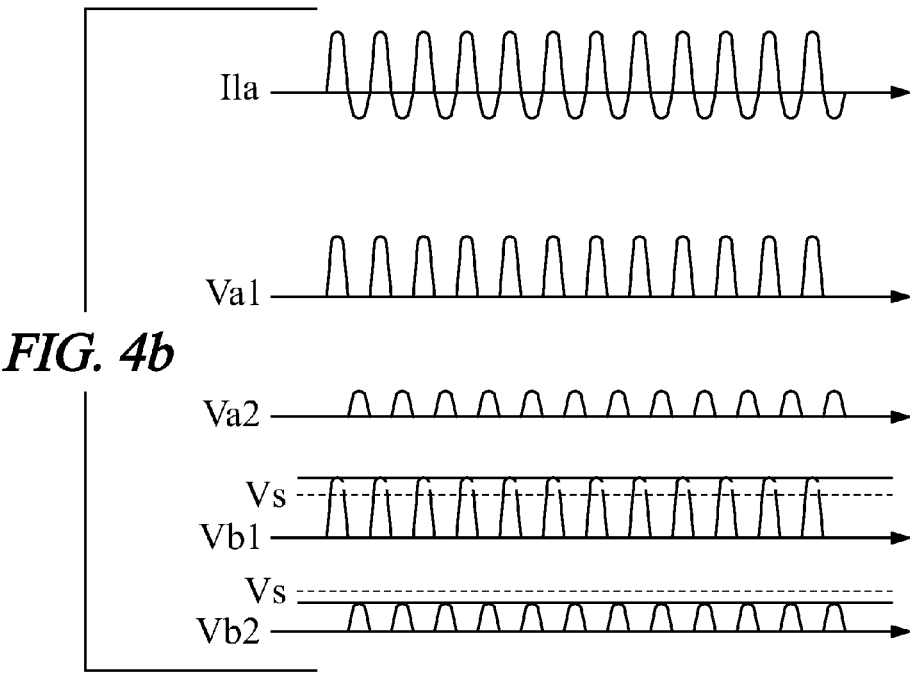

As shown in FIG. 4(a), if the lamp current Ila is symmetrical, both of the charge voltages Vb1 and Vb2 on the respective capacitors C1 and C2 exceed a symmetry determination voltage Vs, whereby an output Ve from the AND circuit (i.e. an output from the asymmetry determination circuit 2, referred to as a "determination output" hereinafter) exhibits a High level. In contrast, as shown in FIG. 4(b), a lamp current which is asymmetrical causes the charge voltage Vb2 on capacitor C2 to fall under the symmetry determination voltage Vs, whereby the determination output Ve exhibits a Low level. That is, the High level exhibited by the determination output Ve means power output to the discharge lamp La was determined to be symmetrical by the asymmetry determination circuit 2, as opposed to the Low level exhibited by the determination output Ve to mean power output to the discharge lamp La is determined to be asymmetrical by the asymmetry determination circuit 2.

The control circuit 3 drives the switching elements Q1 to Q4 to be turned on/off so that the diagonally connected switching elements Q1 to Q4 are turned on simultaneously and the series connected switching elements Q1 to Q4 are turned on/off alternately. Therefore, DC power input from the DC power source E is converted into AC power, and the AC power has a frequency which corresponds to a frequency obtained in polarity inversion by the above on/off driving (referred to as a "driving frequency" hereinafter).

Figure 5:
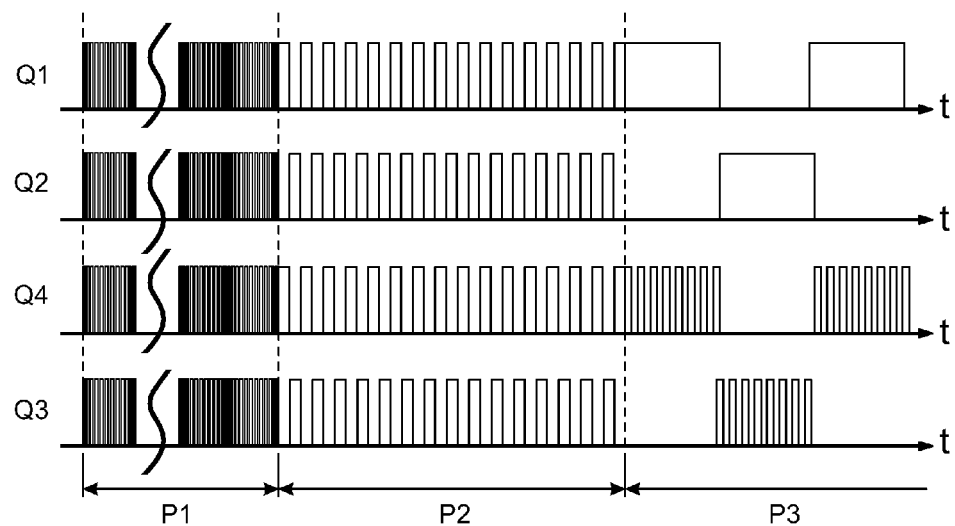
FIG. 5 is a graphical diagram of a driving signal input from a control circuit to each switching element according to an embodiment of the present invention.

More details of operation in the control circuit 3 will be explained below with reference to FIGS. 5 to 7. FIG. 5 shows a driving signal input to each of the switching elements Q1 to Q4, or more specifically a voltage applied between a gate and a source thereof, wherein each of the switching elements Q1 to Q4 is turned on in a period of the High level exhibited by the above driving signal and turned off in a period of the Low level exhibited by the above driving signal.

When the power source is turned on (Step S1 in FIG. 7), the control circuit 3 enters a starting operation to start discharge in the lamp La (S2). In a starting period P1 during which the starting operation is carried out, the control circuit 3 sets an operating frequency to several hundreds kHz and the operating frequency is adjusted periodically (swept) within a range having a width of several tens kHz. During this starting period P1, the operating frequency approaches a resonant frequency (or an integer fraction thereof) associated with a resonant circuit that includes a primary winding portion of the secondary inductor L2 serving as an autotransformer and the second capacitor C4. The resonant voltage generated at this time is boosted by the second inductor L2 serving as an autotransformer and an output voltage Vla to the discharge lamp La (referred to as a "lamp voltage" hereinafter) therefore reaches a voltage required for ignition or to start discharge (e.g. 3 to 4 kV), so that the lamp La is ignited.

Figure 6:
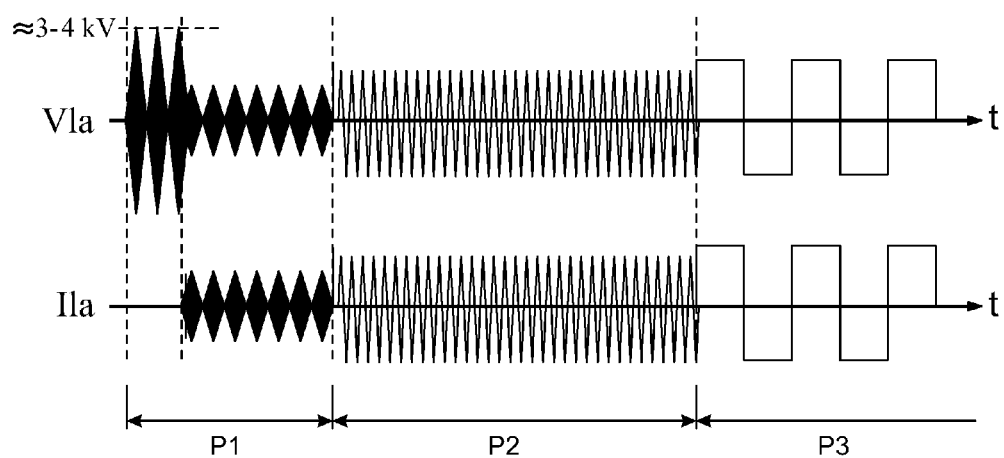
FIG. 6 is a graphical diagram of another example of an operation according to an embodiment of the present invention.
Figure 7:
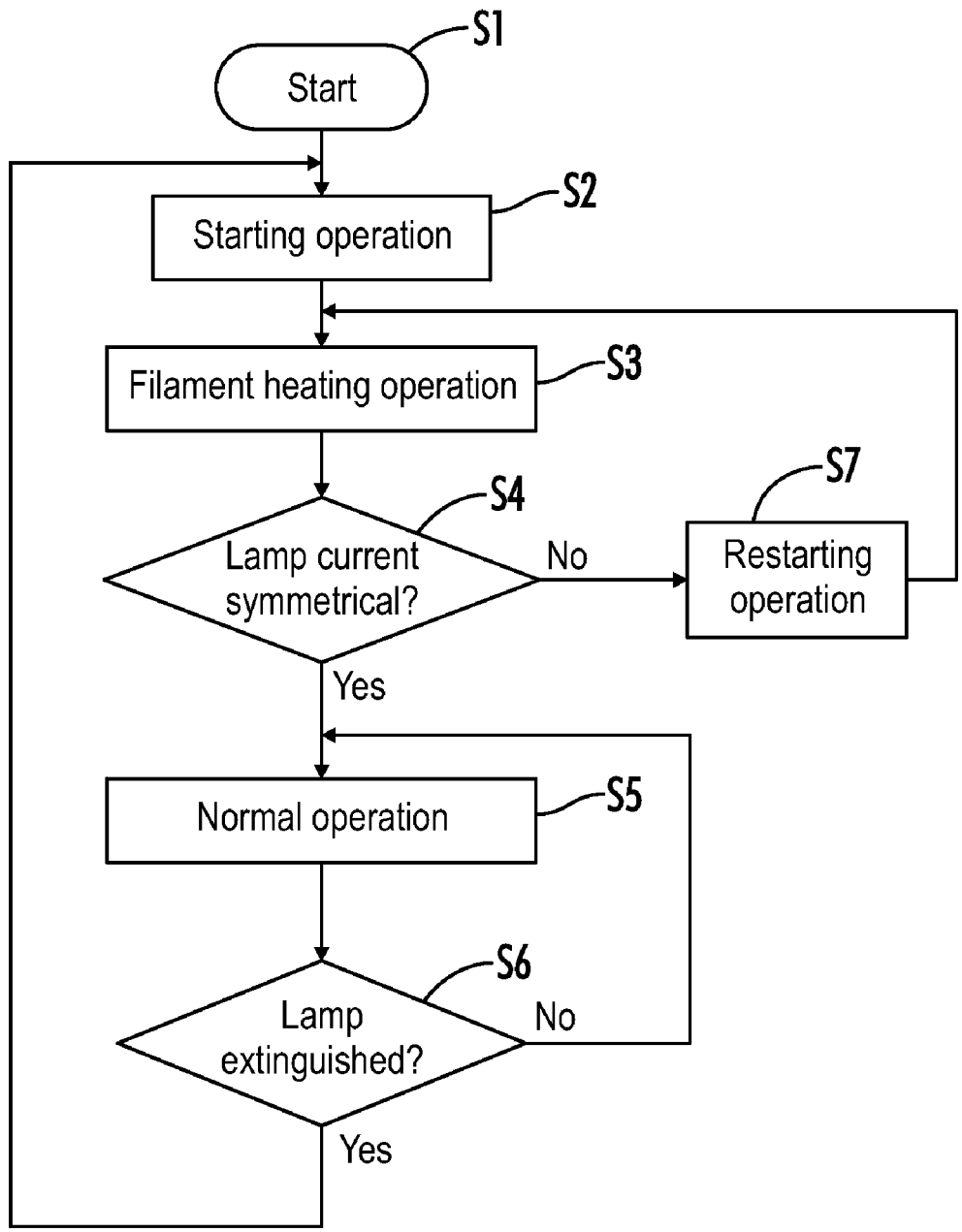
FIG. 7 is a flowchart showing an example of ballast operation according to an embodiment of the present invention.

In an example as shown in FIG. 6, the lamp La is ignited when the lamp current Ila begins to flow in a third cycle of the operating frequency sweep, and an impedance change accompanied by ignition of the lamp La causes an amplitude reduction in the lamp voltage Vla.

After maintaining the above starting operation for a predetermined period of time, the control circuit 3 completes the starting operation and transitions to a filament heating period P2 in which a filament heating operation is carried out by making the operating frequency lower (e.g. several tens kHz) than that during starting operation (S3). The operating frequency during filament heating is a relatively high frequency close to a resonant frequency in the load circuit, in comparison with operating frequency during normal lamp operation to be described later. Therefore, each lamp filament is heated. After maintaining filament heating for the predetermined period of time, the control circuit 3 refers to an output from the asymmetry determination circuit 2 (S4), and if the lamp current Ila is determined to be symmetrical by the asymmetry determination circuit 2 (i.e. an High level exhibited by the determination output Ve), the process moves to normal operation (S5).

During a normal period P3 in which normal lamp operation is carried out, the control circuit 3 makes the operating frequency much lower (e.g. several tens kHz) than that during filament heating so as to supply rectangular wave AC power to lamp La for stable lighting. During normal operation, the control circuit 3 also performs a PWM control to adjust the power supplied to the lamp La by turning on/off each of the switching elements Q3 and Q4 in one of the series circuits at a predetermined duty ratio without constantly turning them on even in a period during which the switching elements Q1 and Q2 are turned on. During normal operation, the control circuit 3 further detects whether the lamp La has been extinguished based on, for example, the lamp current Ila (S6), and if so normal operation is terminated and the operation returns to the starting operation in step S2.

If the lamp current Ila is determined to be asymmetrical by the asymmetry determination circuit 2 in step S4 (i.e., a Low level exhibited by the determination output Ve), the process moves to a restart operation (S7). More specifically, in initiating the restart operation, the control circuit 3 initially detects which of the positive or negative polarity has a lower lamp current by, for example, obtaining an output from each of the comparators CP1 and CP2 in the asymmetry determination circuit 2. The restart operation makes, for example, an on-time higher (i.e., increases a duty ratio) in a pair of the switching elements Q1 to Q4 compared to the starting operation, by which a voltage is applied to the polarity having the lower lamp current Ila (or alternatively the polarity having a higher lamp voltage Vla) out of the switching elements Q1 to Q4. This in other words makes the duty ratio lower for the remaining two of the switching elements Q1 to Q4 compared to that in the starting operation.

Figure 1:
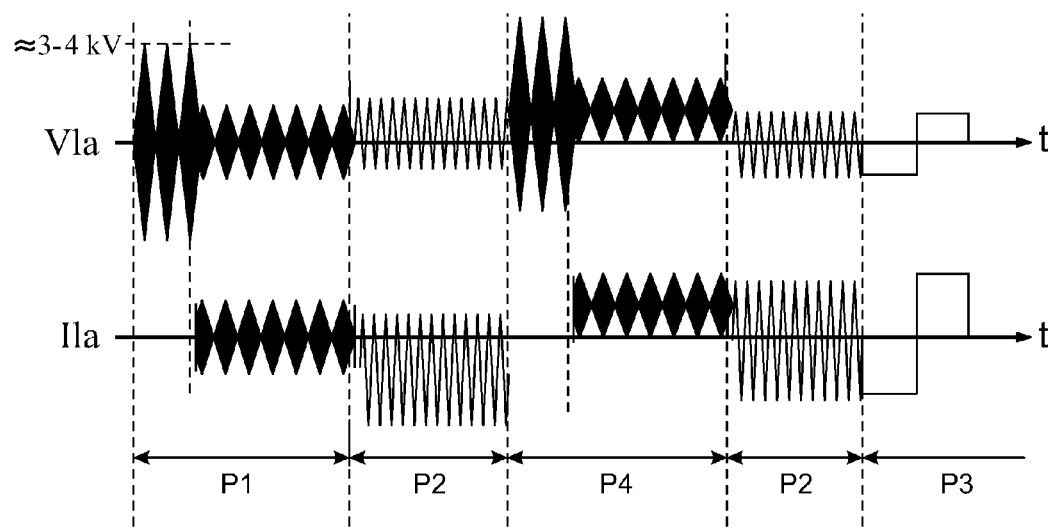
FIG. 1 is a graphical diagram showing ballast operation according to an embodiment of the present invention.

For example, if the lamp current Ila is larger in a negative polarity than a positive polarity during the first filament heating period P2 as shown in FIG. 1, the duty ratio is made higher for any of the switching elements Q1 to Q4 by which a voltage is applied in a positive direction in a subsequent restart period P4 during which the restart operation is carried out, whereby an amplitude of the lamp voltage Vla is made larger in a positive polarity than in a negative polarity. The control circuit 4 maintains the restart operation for a predetermined period of time (e.g., the same period as the starting operation), followed by restarting the filament heating operation in the step S3. In the example of FIG. 1, the lamp current Ila is brought into a symmetrical state upon completion of the second filament heating operation P2, followed by a transition to the normal period P3.

According to the above operation, it is made easier to resolve an asymmetrical state of the lamp current Ila in a short period of time, in comparison with simply returning to the starting operation if the lamp current Ila is determined to be asymmetrical.

Figure 8:
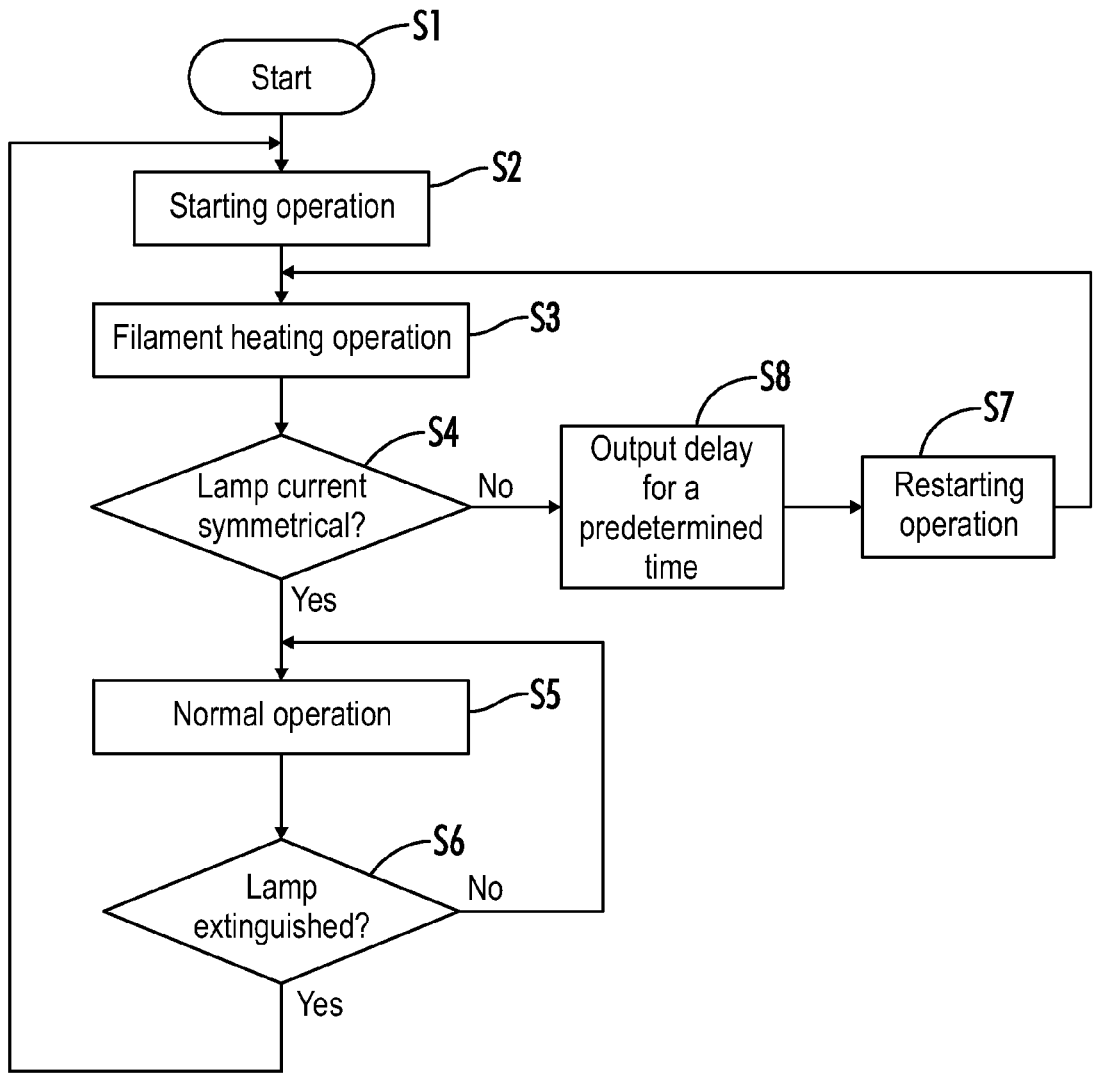
FIG. 8 is a flowchart showing another example of ballast operation according to an embodiment of the present invention.

Note that, after determination of the lamp current Ila as being asymmetrical in the step S4 and before transition to the restart operation in step S7, the control circuit 3 may also cause a delay operation (S8) as shown in FIG. 8 to turn off each of the switching elements Q1 to Q4 for a predetermined delay period so as to stop power output to the discharge lamp La. If this operation is employed, it is made much easier to resolve an asymmetrical state of the lamp current Ila because gas is stabilized in the discharge lamp La during the delay operation.

Figure 9:
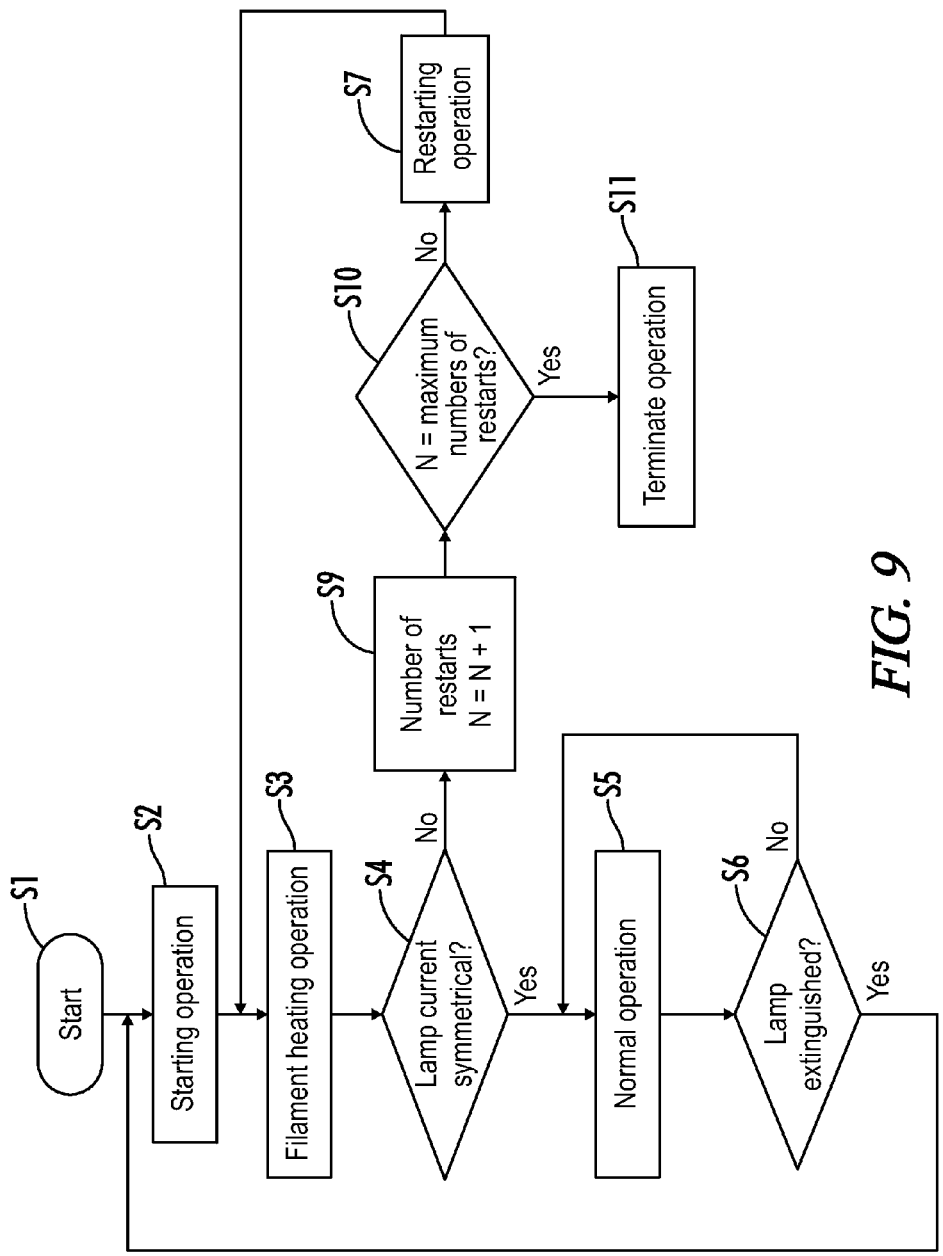
FIG. 9 is a flowchart showing another example of operation according to an embodiment of the present invention.

The number of iterations for the restart operation may also be restricted. More specifically, as shown in FIG. 9, the control circuit 3 calculates the number of times N in which the lamp current Ila has been determined to be asymmetrical in the step S4 (referred to as a "the number of restarts" hereinafter) (step S9), and compares the number of restarts N to a predetermined maximum number of restarts N (step S10). This is followed by transition to the restart operation in step S7 if the number of restarts N does not reach the maximum number of restarts. If the number of restarts reaches the maximum number of restarts, power supplied to the discharge lamp La is terminated by, for example, turning off each of the switching elements Q1 to Q4 (S11). That is, the restart operation is not carried out more than the maximum number of restarts, thereby making it possible to prevent unnecessary electrical stresses from being applied to circuit components through endless repetition of the restart operation and the filament heating operation.

Figure 10:
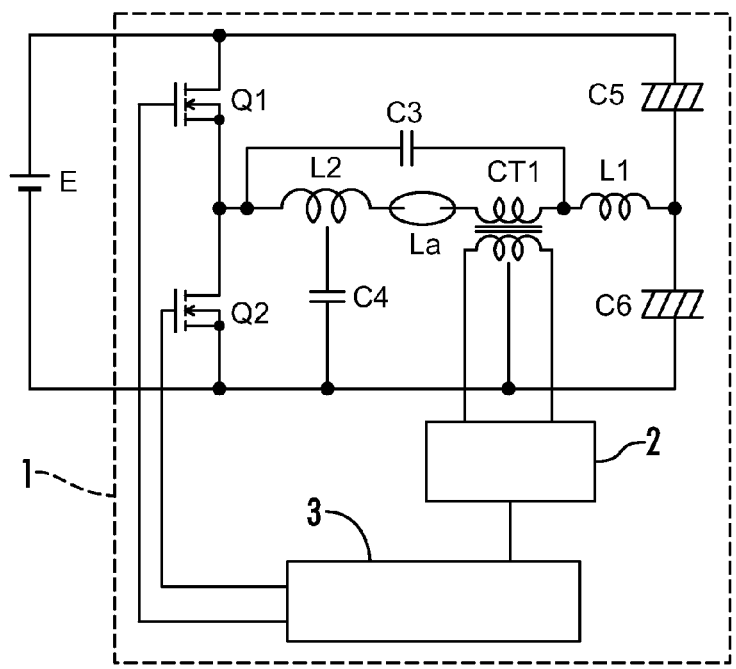
FIG. 10 is a circuit diagram of a ballast in accordance with another embodiment of the present invention.
Figure 11:
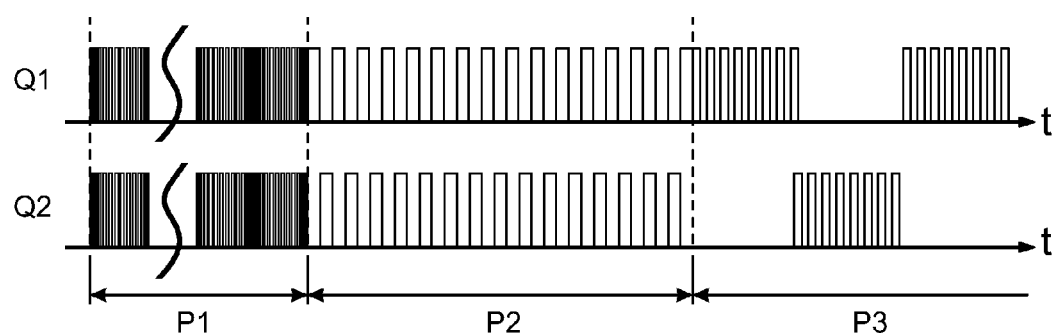
FIG. 11 is a graphical diagram showing an example of a driving signal input from the control circuit to each switching element in the embodiment of FIG. 10.

The scope of the present invention is of course not limited to the circuit configuration shown in FIG. 2, and for example as shown in FIG. 10, a half bridge inverter circuit may also be employed by replacing the switching elements Q3 and Q4 with capacitors C5 and C6 respectively. As shown in FIG. 11, the switching elements Q1 and Q2 are driven to be turned on/off in the starting period P1 and the filament heating operation P2 in a manner consistent with the examples of FIGS. 2 to 6. PWM control is performed in the normal period P3 to adjust power output to the discharge lamp La by a duty ratio obtained in turning on/off the switching elements Q1 and Q2, each of which should be turned on in a period during which polarity inversion is not carried out.

Figure 12:
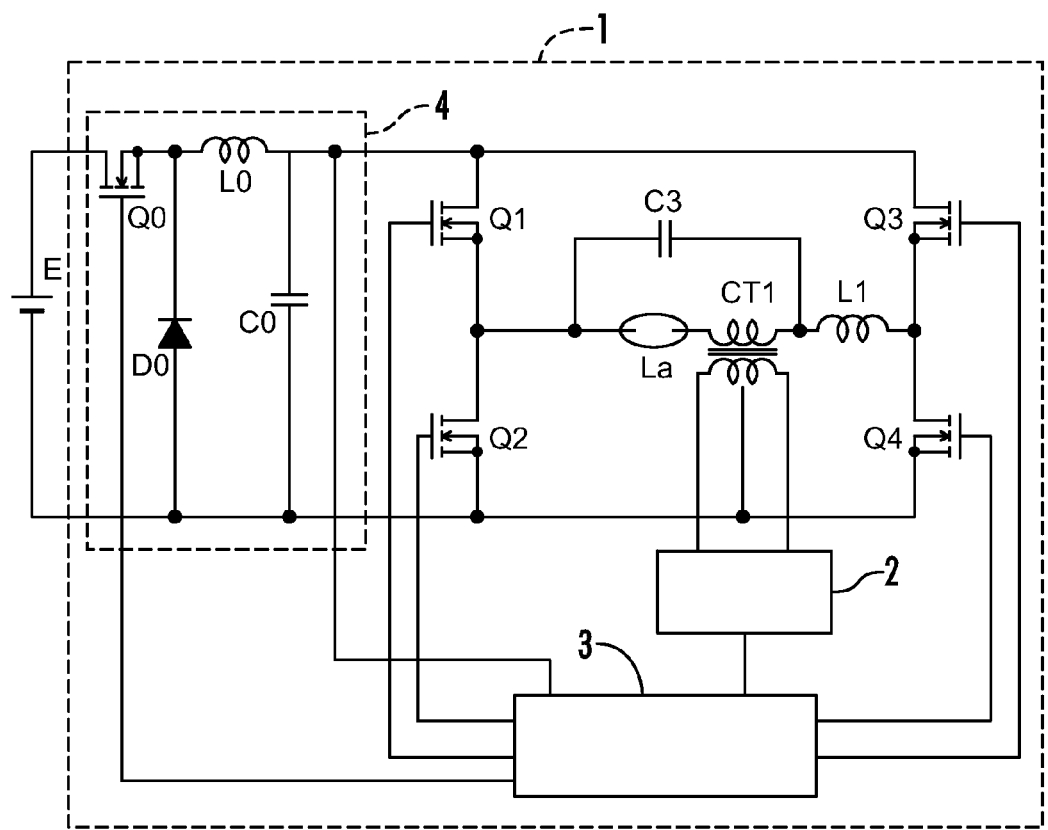
FIG. 12 is a circuit diagram showing a ballast in accordance with another embodiment of the present invention.
Figure 13:
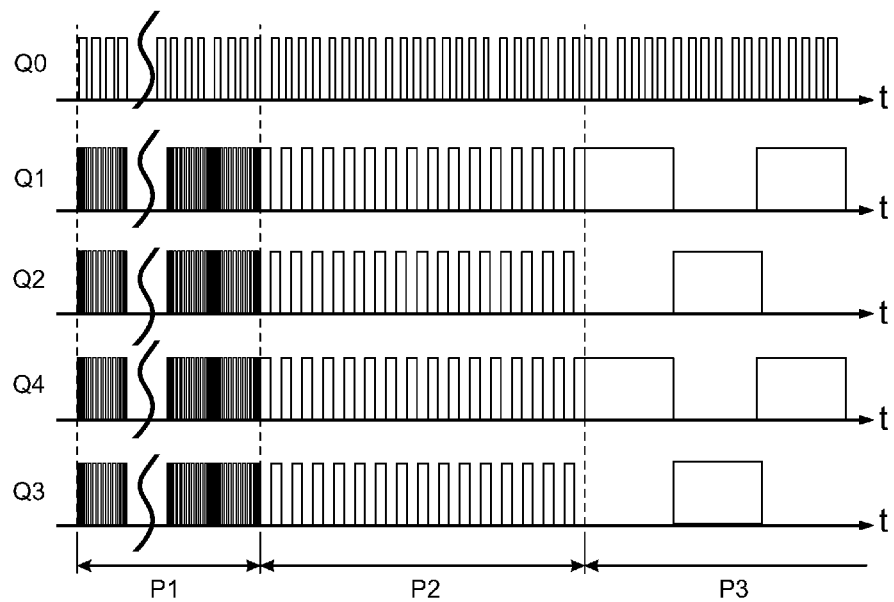
FIG. 13 is a graphical diagram showing an example of a driving signal input from the control circuit to each switching element in the embodiment of FIG. 12.

A step-down chopper circuit 4 or buck converter 4 may also be arranged as shown in FIG. 12 to step down the voltage output from the DC power source E to the full bridge circuit. In this case, a power conversion circuit therefore includes the full bridge circuit having the four switching elements Q1 to Q4 and the above step-down chopper circuit 4. In the example of FIG. 12, the step-down chopper circuit 4 includes a switching element Q0 with one end coupled to an output terminal of the DC power source E on a high voltage side and the other end coupled to an input terminal of the full bridge circuit via an inductor L0, a diode D0 with a cathode coupled to a node between the switching element Q0 and the inductor L0 and an anode coupled to ground, and a capacitor C0 coupled across the input terminals of the full bridge circuit or the output terminals of the step-down chopper circuit 4. The example of FIG. 12 also shows a resonant circuit in which the second inductor L2 and the second capacitor C4 are omitted, wherein the starting operation uses resonant characteristics associated with the first capacitor C3 and the first inductor L1 to output a high voltage for igniting the lamp La. Furthermore, as shown in FIG. 13, the control circuit 3 controls power supplied to the lamp La by a duty ratio obtained in turning on/off the switching element Q0 in the step-down chopper circuit 4, which means a PWM control operation of turning on/off the switching elements Q1 to Q4 in the full bridge circuit is not carried out even in the normal period P3.

Figure 14:
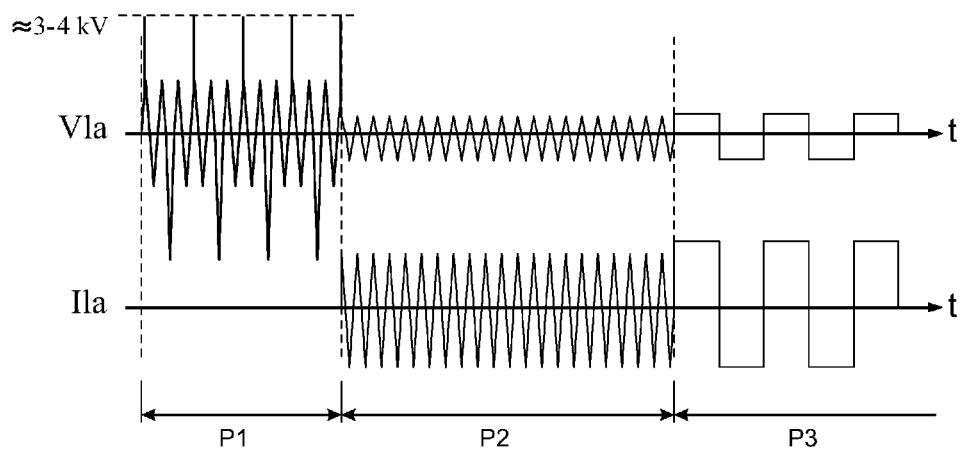
FIG. 14 is a graphical diagram showing an operation according to an embodiment when no asymmetrical current occurs.
Figure 15:
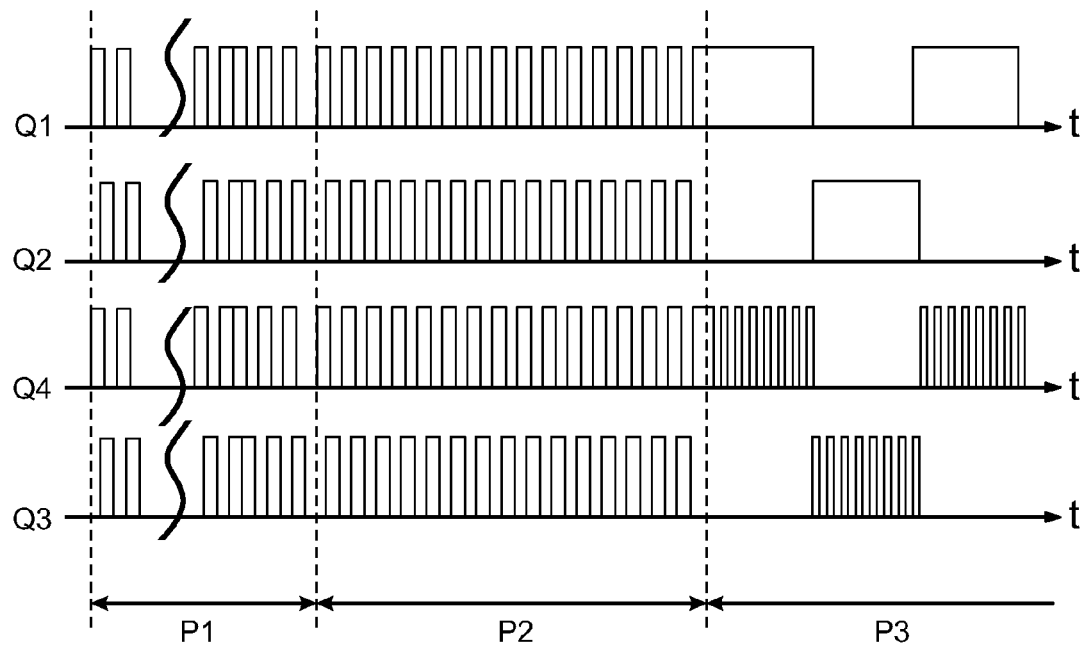
FIG. 15 is a graphical diagram showing an example of a driving signal input from the control circuit to each switching element in the embodiment of FIG. 14.
Figure 16:
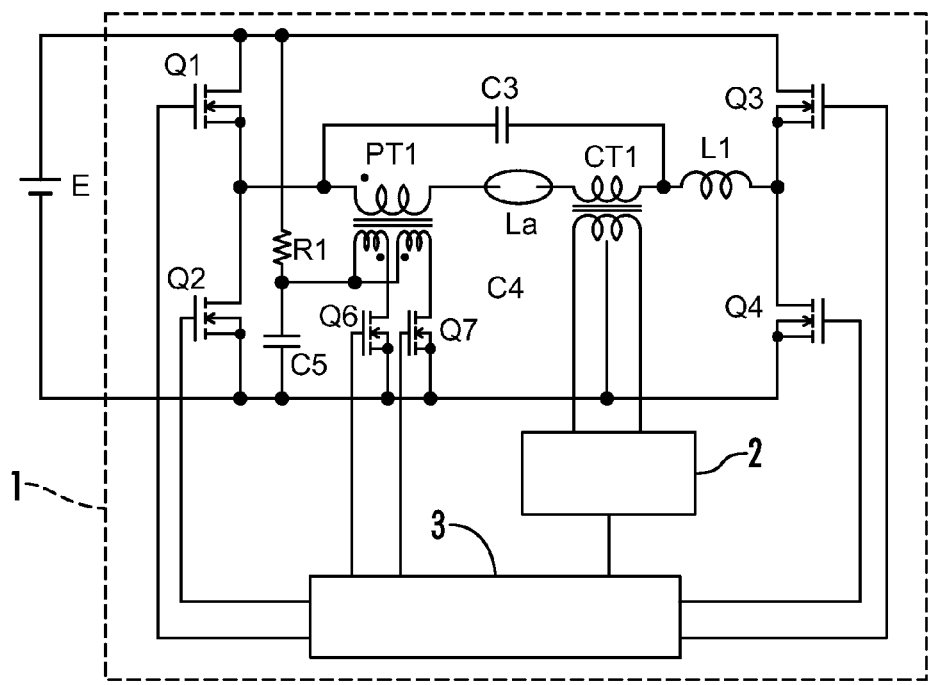
FIG. 16 is a circuit diagram showing an embodiment of a ballast in accordance with the operation shown in FIG. 14.

Alternatively, as shown in FIG. 14 a pulse generation circuit may also be arranged as the resonant circuit to generate a high voltage pulse for starting the discharge lamp La during the starting period P1. In this case, the operating frequency during the starting period P1 can be the same as the operating frequency during the filament heating period P2 as shown in FIG. 15. More specifically, in place of the second inductor L2 and the second capacitor C4, for example, a pulse transformer PT1 is arranged as shown in FIG. 16 wherein a primary winding thereof is coupled between the lamp La and a node between the first capacitor C3 and the switching elements Q1 and Q2, and further including two secondary windings.

A series circuit including a resistor R1 and a third capacitor C5 is further coupled across the DC power source E in parallel with the switching elements Q1 and Q2. A first end of each of the secondary windings of the pulse transformer PT1 is coupled to a node between the resistor R1 and the third capacitor C5, and the second ends of the secondary windings are coupled to ground via individual switching elements Q6 and Q7 respectively.

Figure 17:
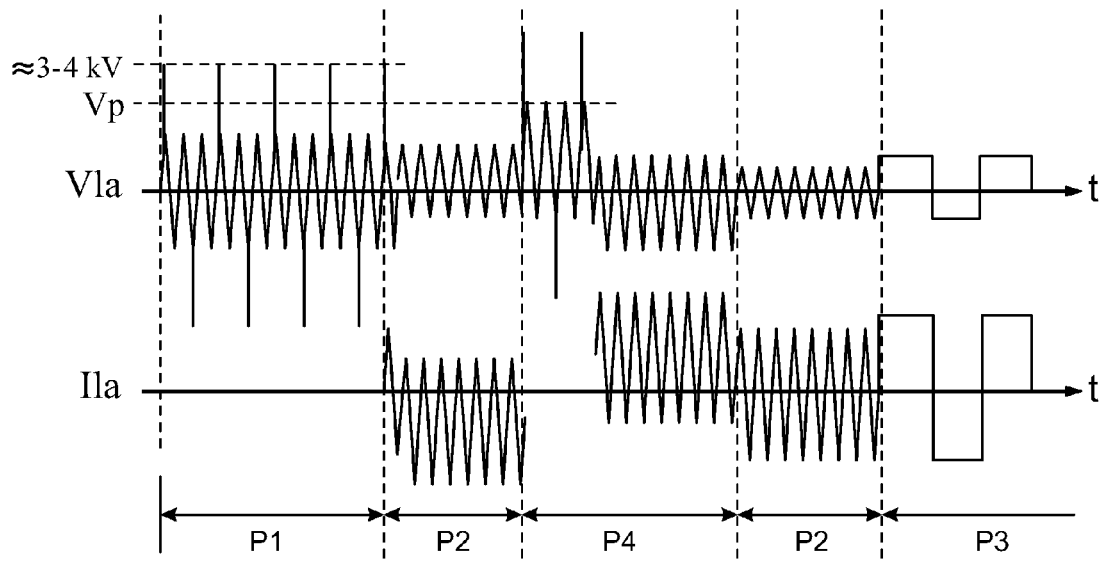
FIG. 17 is a graphical diagram showing an example of operation when an asymmetrical current occurs.
Figure 18:
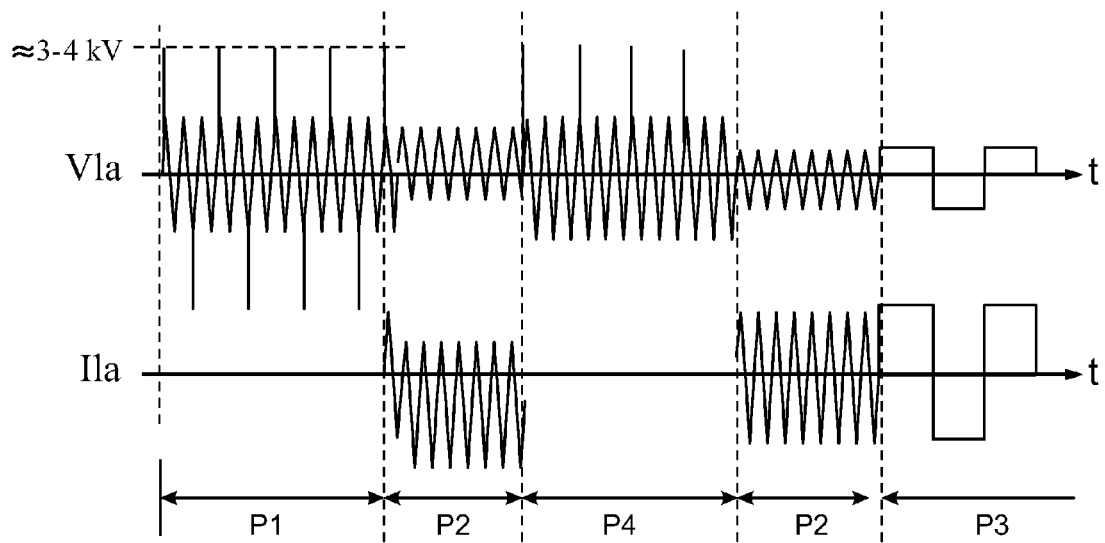
FIG. 18 is a graphical diagram showing another example of operation when asymmetrical current occurs.
Figure 19:
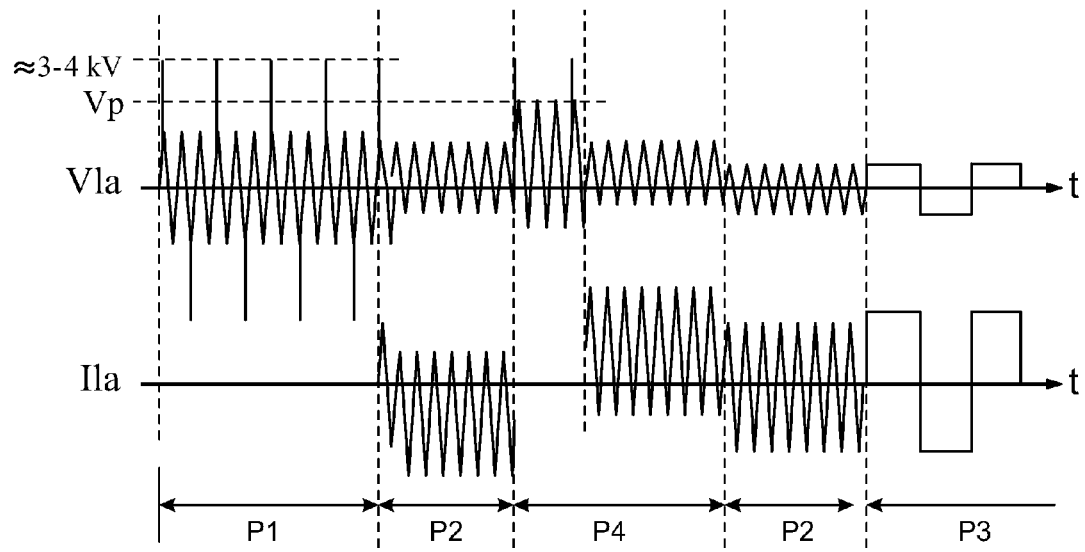
FIG. 19 is a graphical diagram showing another example of operation when asymmetrical current occurs.
Figure 20:
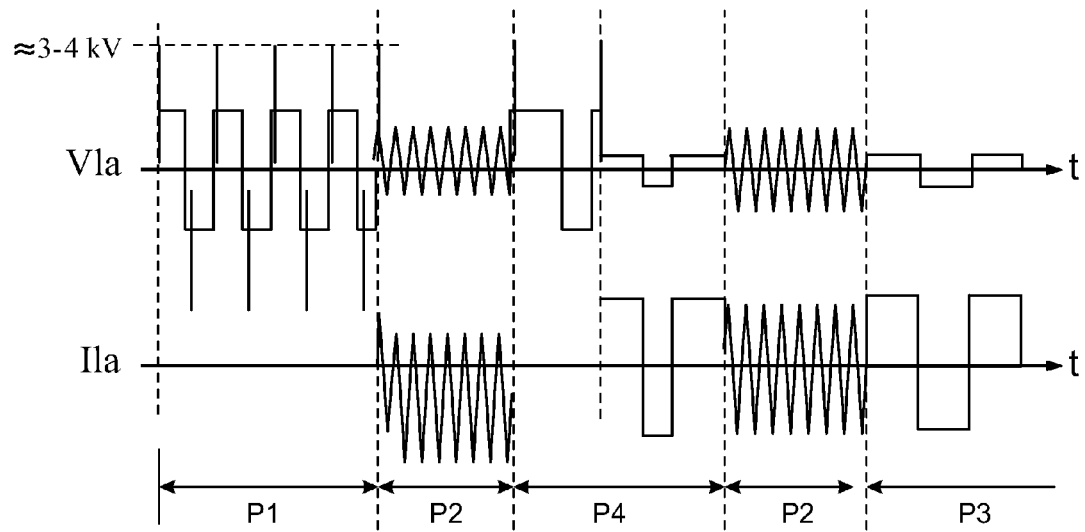
FIG. 20 is a graphical diagram showing another example of operation when asymmetrical current occurs.

When one of the switching elements Q6 and Q7 is turned on, a pulse voltage in a polarity corresponding to the switching element Q6, Q7 that was turned on is superimposed on the lamp voltage Vla. The control circuit 3 controls the switching elements Q6 and Q7 in the above pulse generation circuit to be turned on/off at an appropriate frequency during the starting operation and the restart operation, whereby a pulse voltage for starting is generated. That is, in the example of FIG. 16, the pulse transformer PT1, the resistor R1, the third capacitor C5 and the switching elements Q6 and Q7 constitute the pulse generation circuit or the resonant circuit.

Where the pulse generation circuit is used to generate the above pulse with an even polarity in the starting operation, the restart operation may also be carried out by changing the duty ratio in the switching elements Q1 to Q4 in the full bridge circuit so as to increase the amplitude in a polarity having a lower amount of lamp current Ila (or having a higher lamp voltage Via) as shown in FIG. 17 and in the same manner as with the example of FIG. 1. Alternatively, the restart operation may be carried out by increasing the number of pulses in the polarity having a lower amount of lamp current Ila (or having a higher lamp voltage Vla) more than the number of pulses in the other polarity (e.g. rendering the number of pulses in one of the polarities to be equivalent to the number of pulses in the starting operation while setting 0 for the number of the pulses in the other polarity) as shown in FIG. 18, or by both operations in combination as shown in examples of FIGS. 19 and 20, including a duty ratio change in the switching elements Q1 to Q4 in the full bridge circuit as explained in the example of FIG. 17 and pulse generation in only one of polarities as explained in the example of FIG. 18. In the starting period P1 and the restart period P4 in the example of FIG. 20, a sufficiently low frequency (e.g. equivalent to the frequency applied during the normal period P3) is applied to turn on/off the switching elements Q1 to Q4 in the full bridge circuit, wherein the lamp voltage Vla exhibits a rectangular waveform and the amplitude of the lamp voltage Vla is substantially equivalent in each polarity.

Figure 21:
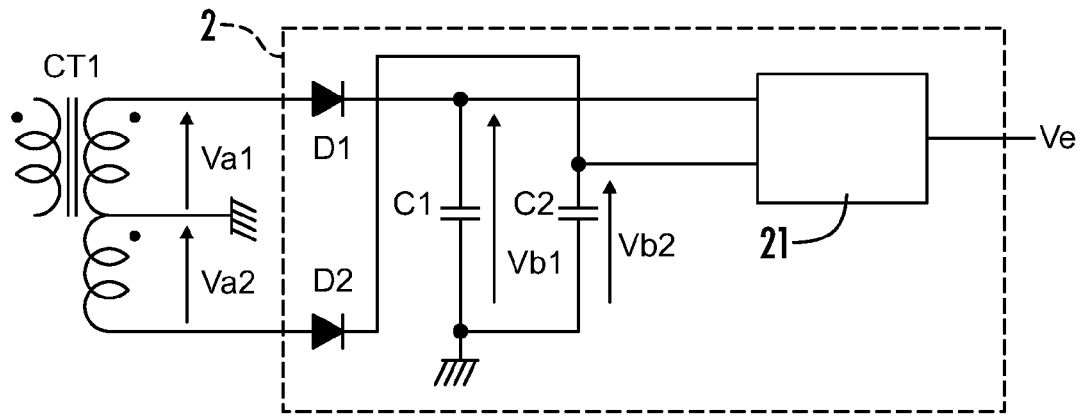
FIG. 21 is a circuit diagram showing another embodiment of the asymmetry determination circuit of the present invention.

The asymmetry determination circuit 2 is not limited within the scope of the present invention to the configuration shown in FIG. 3, and may also be realized by, for example, a configuration as shown in FIG. 21. The asymmetry determination circuit 2 in FIG. 21 includes, in place of the comparators CP1 and CP2, a calculation circuit 21 for calculating an absolute value |Vb1−Vb2| from a difference of the input charge voltages Vb1 and Vb2 on the capacitors C1 and C2 respectively for comparison with a predetermined determination threshold. If the absolute value |Vb1−Vb2| is less than the determination threshold, the calculation circuit 21 determines the lamp current Ila to be symmetrical and brings the output (determination output) Ve to the control circuit 3 into the High level, while determination of the above absolute value |Vb1−Vb2| as being equal to or more than the determination threshold is accompanied by determination of the lamp current Ila as being asymmetrical and the determination output Ve is brought into the Low level.

The control circuit 3 may in various embodiments also cause the restart operation to correspond to a degree of an asymmetrical state in the lamp current Ila. Using for example the asymmetry determination circuit 2 as shown in FIG. 21, the absolute value |Vb1−Vb2| calculated from the difference of the charge voltages Vb1 and Vb2 on the respective capacitors C1 and C2 (referred to as an "asymmetrical voltage" hereinafter) is obtained from the calculation circuit 21. This is followed by, for example, increasing the on-time difference (duty ratio) in the switching elements Q1 to Q4 in the full bridge circuit as the asymmetrical voltage |Vb1−Vb2| is increased, so that the peak value Vp of the lamp voltage Vla (simply referred to as a "peak voltage" hereinafter) except for the high voltage pulse is increased in a polarity having a lower amount of pulse current Ila.

Figure 22:
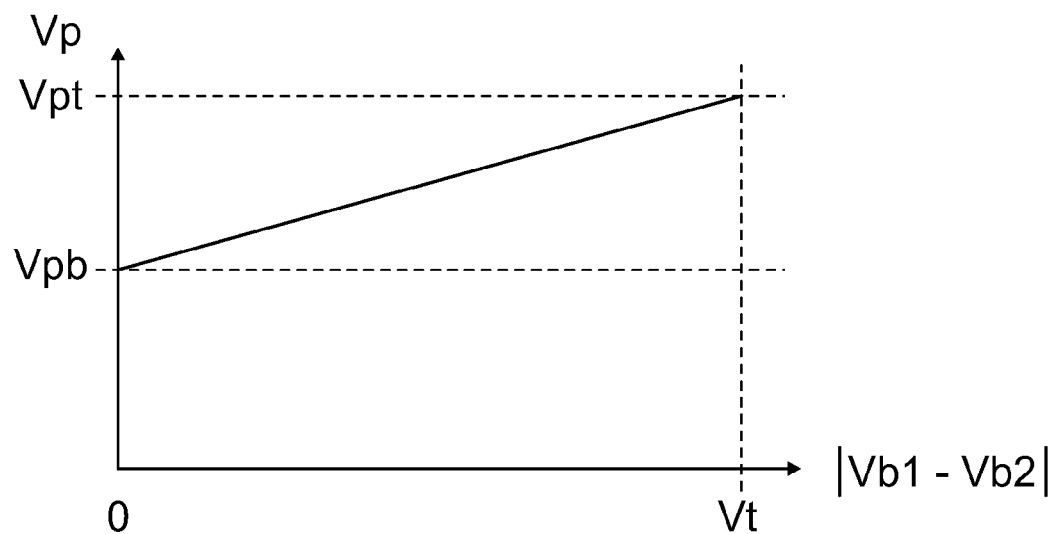
FIG. 22 is a graphical diagram showing a voltage relationship in an embodiment of the present invention.

In the example of FIG. 22, the peak voltage Vp is set to a minimum value Vpb when the asymmetrical voltage |Vb1−Vb2| is 0, and set to a maximum value Vpt when the asymmetrical voltage |Vb1−Vb2| is equal to or more than a predetermined maximum voltage Vt, wherein the peak voltage Vp is gradually increased in a linear state relative to the asymmetrical voltage |Vb1−Vb2| which is equal to or less than the predetermined maximum voltage Vt. The maximum voltage Vt refers to a value taken by the asymmetrical voltage |Vb1−Vb2| when the amplitude of the lamp current Ila is 0 in one of polarities. A value which is low enough to prevent a voltage applied to any circuit components from exceeding a breakdown voltage is also set for the maximum value Vpt in the peak voltage Vp. Moreover, even though the restart operation is not carried out in practice when the asymmetrical voltage |Vb1−Vb2| is 0, the above minimum value Vpt refers to, for example, a value assumedly taken by the amplitude of the lamp voltage Vla other than pulses in the normal starting operation.

Figure 23:
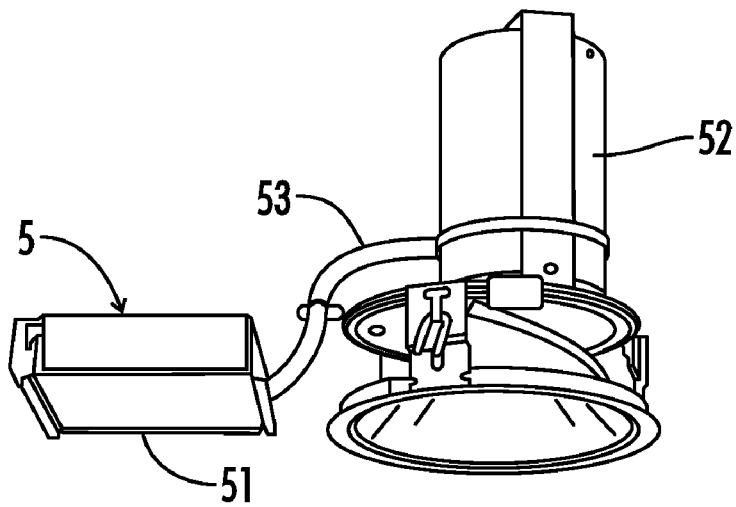
FIG. 23 is a perspective view showing an example of a lamp fixture using an embodiment of the present invention.
Figure 24:
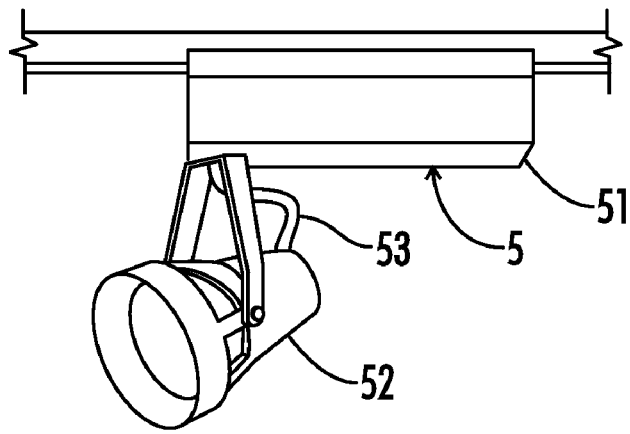
FIG. 24 is a perspective view showing another example of a lamp fixture using an embodiment of the present invention.
Figure 25:
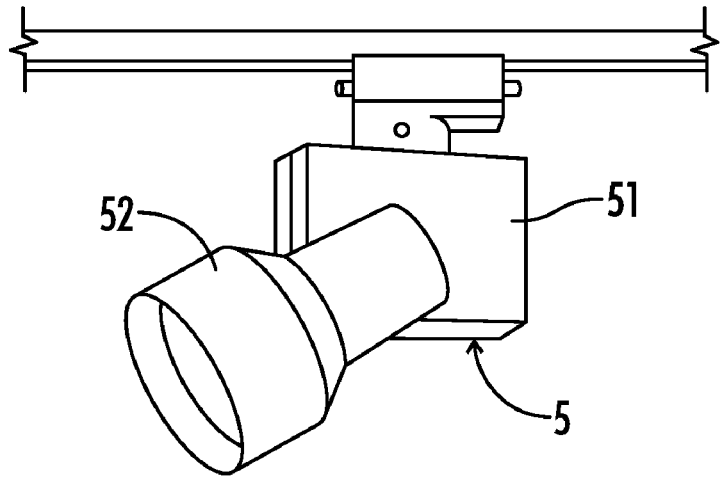
FIG. 25 is a perspective view showing further another example of a lamp fixture using an embodiment of the present invention.
Figure 26A:
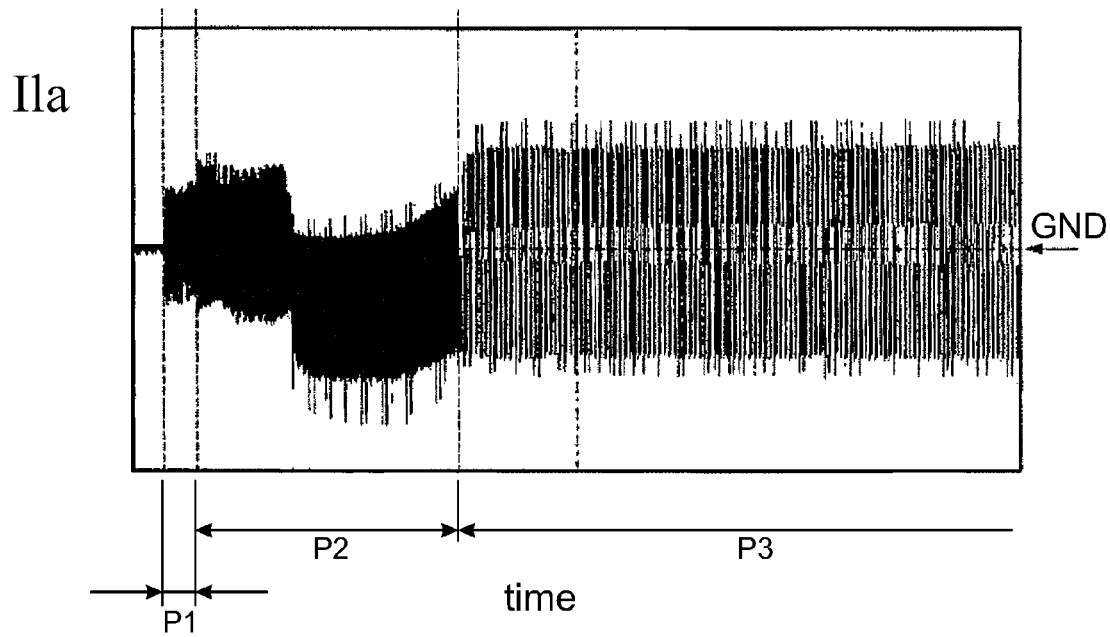
FIGS. 26(a) and 26(b) are graphical diagrams showing lamp current waveforms with FIG. 26(a) corresponding to an insufficient duration for a filament heating operation and FIG. 26(b) corresponding to a sufficiently long duration for filament heating operation.
Figure 26B:
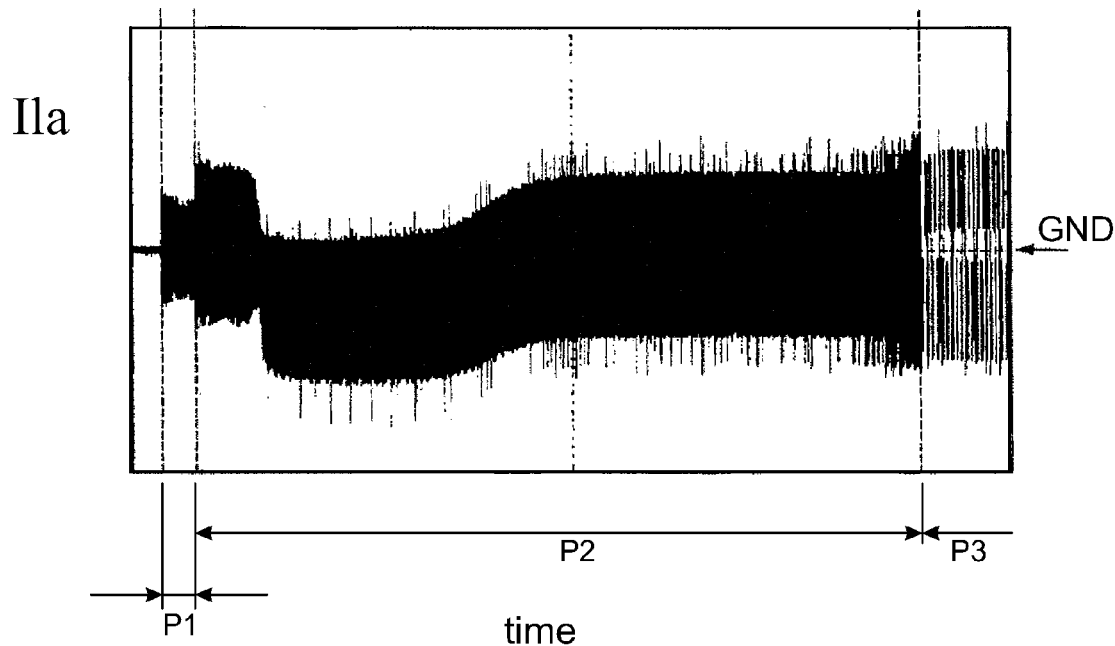

Various embodiments of the discharge lamp ballast 1 as described herein or equivalent thereto can be used for lamp fixtures 5 as shown in FIGS. 23 to 25. Each of the lamp fixtures 5 shown in FIGS. 23 to 25 includes a fixture main body 51 for storing the discharge lamp ballast 1, and a lamp body 52 for holding the discharge lamp La. In each of the lamp fixtures 5 shown in FIGS. 23 and 24, a power supply line 53 is provided to electrically couple the ballast 1 and the lamp La. The lamp fixture 5 in FIG. 23 corresponds to a downlight in which the fixture main body 51 and the lamp body 52 are both fixed onto a ceiling surface, whereas the lamp fixtures 5 in FIGS. 24 and 25 correspond to a spotlight in which the lamp body 52 is mounted to pivot or swing as opposed to the fixture main body 51 fixed onto a mounting surface such as ceiling surface. The various kinds of lamp fixture 5 can be realized by a known technique and detailed explanation thereof will be omitted.

Thus, although there have been described particular embodiments of the present invention of a new and useful Electronic Ballast for Correcting Asymmetrical Current Flow Across a Gas Discharge Lamp it is not intended that such references be construed as limitations upon the scope of this invention except as set forth in the following claims.

What is claimed is:

1. A discharge lamp ballast comprising:
   an inverter coupled to a DC power source and comprising a plurality of switching elements, the inverter operable to provide an AC output current having positive and negative polarities;
   an asymmetry determination circuit functional to determine whether the AC output current from the inverter is symmetrical and to provide a corresponding output;
   a control circuit functional to control the plurality of switching elements to provide lamp power dependent upon an operating mode and on the output from the asymmetry determination circuit;
   wherein the control circuit controls the switching elements in a normal mode upon receiving a determination of symmetrical current from the asymmetry determination circuit;
   wherein the control circuit transitions to a delay mode when the polarities are determined to be asymmetrical by the asymmetry determination circuit,
   the delay mode comprises a delay operation wherein each of the plurality of switching elements are turned off for a predetermined delay period so as to stop power output to the discharge lamp; and
   wherein the control circuit transitions to a restart mode for a predetermined period of time after the predetermined delay period elapses.

2. The ballast of claim 1, wherein the control circuit operating in the restart mode is functional to increase a duty ratio for one or more of the plurality of switching elements associated with the lower value of the positive and negative polarities.

3. The ballast of claim 1, wherein the control circuit in the restart mode is functional to control one or more of the plurality of switching elements to provide one or more high voltage pulses only with respect to the lower value of the positive and negative polarities.

4. The ballast of claim 1, wherein the control circuit in the restart mode is functional to control one or more of the plurality of switching elements to make a number of high voltage starting pulses larger with respect to the lower value of the positive and negative polarities.

5. The ballast of claim 1, wherein the control circuit in the restart mode is functional to control one or more of the plurality of switching elements to increase an amplitude of a voltage output from the inverter with respect to the lower value of the positive and negative polarities.

6. The ballast of claim 1, wherein the control circuit is further functional to calculate a number of restarts and to turn off each of the switching elements upon determination that the number of restarts is equal to a predetermined maximum number of restarts.

7. A discharge lamp ballast comprising:
a DC-AC power converter having power output terminals;
a resonant circuit connected between the output terminals of the power to provide a lamp starting voltage;
an asymmetry determination circuit coupled to the DC-AC power converter and functional to determine whether output current from the power converter to the discharge lamp is symmetrical with regards to a positive and a negative polarity;
a control circuit coupled to the power converter for controlling the power converter in accordance with a starting mode, a filament heating mode and a normal mode;
wherein in the starting mode a first output frequency from the power converter is supplied to the resonant circuit;
wherein in the filament heating mode the output frequency from the power converter is adjusted to a second frequency for a predetermined period of time so that each filament of a discharge lamp can be heated;
wherein in the normal mode the output frequency from the power converter is adjusted to a third frequency that is lower than the second frequency;
wherein the control circuit is functional after completion of the filament heating mode to transition to the normal mode upon a symmetrical determination of the output current by the asymmetry determination circuit; and
wherein the control circuit is functional after completion of the filament heating mode to transition to a restart mode further comprising repeating the filament heating mode with an operation to reduce a difference in the output current between the positive and the negative polarities upon an asymmetrical determination of the output current by the asymmetry determination circuit.

8. The ballast of claim 7, wherein the asymmetry determination circuit comprises a comparator functional to compare peak values for the positive and the negative polarities of the output current from the power converter to a predetermined threshold voltage, and to determine that the output current is symmetrical when both peak values exceed the predetermined threshold voltage.

9. The ballast of claim 7, wherein the asymmetry determination circuit is functional to calculate an absolute value of the difference between peak values of the positive and negative polarities of the output current from the power converter, and to determine the output current to be symmetrical when the absolute value is less than a predetermined threshold.

10. The ballast of claim 7, further comprising a current transformer having a primary winding coupled to the discharge lamp and a secondary winding, wherein the asymmetry determination circuit is coupled across the secondary winding of the current transformer.

11. The ballast of claim 10, wherein the power converter comprises a first pair of switching elements in a half bridge configuration and the control circuit controls power output from the power converter by a duty ratio obtained in turning on/off the switching elements.

12. The ballast of claim 11, wherein the power converter further comprises a second pair of switching elements in a full bridge configuration, the resonant circuit and the discharge lamp coupled between output terminals located between each of the first and second pairs of switching elements.

13. A method of controlling a plurality of switches in an electronic ballast for powering a discharge lamp, the method comprising:
(a) receiving at the plurality of switches a DC power input;
(b) performing a starting operation by controlling the switches to turn on and off at a first driving frequency to supply an AC output to a resonant circuit wherein a high voltage is generated to ignite the lamp;
(c) performing a heating operation of controlling the switches at a second driving frequency for a predetermined period of time to heat one or more lamp filaments;
(d) determining whether positive and negative peak values of an output current to the lamp are symmetrical or asymmetrical;
(e) upon determining the peak values to be asymmetrical, performing a restart operation for the predetermined period of time to correct the peak value asymmetry, followed by returning to step (d); and
(f) upon determining the peak values to be symmetrical, performing a normal operation of controlling the switches at a third driving frequency to maintain stable lighting.

14. The method of claim 13, wherein the step of performing a restart operation comprises providing one or more high voltage pulses to the discharge lamp only in the polarity having a lower peak value of the current output from the power converter.

15. The method of claim 13, wherein the step of performing a restart operation comprises providing a larger number of high voltage pulses to the discharge lamp in the polarity having a lower peak value of the current output than the other polarity.

16. The method of claim 13, wherein the step of performing a restart operation comprises increasing a voltage output amplitude from the power converter in the polarity having a lower peak value of the current output.

17. The method of claim 13, wherein the step of performing a restart operation comprises increasing a duty ratio for one or more switches associated with the polarity having a lower peak value of the current output.

18. The method of claim 13, further comprising the step of performing a delay operation of turning off the plurality of switches for a predetermined delay time to stop AC power output from the power converter prior to performing the restart operation.

19. The method of claim 13, further comprising the step of calculating the number of previous restarts prior to performing the restart operation and turning off each of the switches to stop AC power output from the power converter upon determining that the number of previous restarts reached a predetermined maximum number of restarts.

* * * * *